US012646479B2

(12) United States Patent
Lan et al.

(10) Patent No.: US 12,646,479 B2
(45) Date of Patent: Jun. 2, 2026

(54) LIGHT DETECTION STRUCTURE, DISPLAY PANEL AND DISPLAY DEVICE

(71) Applicants: Nanjing BOE Display Technology CO., LTD., Nanjing (CN); BOE Technology Group Co., Ltd., Beijing (CN); Beijing BOE Technology Development Co., Ltd., Beijing (CN)

(72) Inventors: Tunghsin Lan, Beijing (CN); Dayu Zhang, Beijing (CN); Xinchen Ma, Beijing (CN); Yueyuan Zhang, Beijing (CN)

(73) Assignees: Nanjing BOE Display Technology CO., LTD., Nanjing (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 293 days.

(21) Appl. No.: 18/619,021

(22) Filed: Mar. 27, 2024

(65) Prior Publication Data

US 2025/0046267 A1 Feb. 6, 2025

Related U.S. Application Data

(63) Continuation of application No. PCT/CN2023/110385, filed on Jul. 31, 2023.

(51) Int. Cl.
*G09G 3/36* (2006.01)

(52) U.S. Cl.
CPC ......... *G09G 3/3677* (2013.01); *G09G 3/3688* (2013.01); *G09G 2330/021* (2013.01); *G09G 2330/12* (2013.01); *G09G 2360/144* (2013.01)

(58) Field of Classification Search
CPC ............... G09G 3/3688; G09G 3/3677; G09G 2360/144; G09G 2330/12; G09G 2330/021
See application file for complete search history.

(56) References Cited

U.S. PATENT DOCUMENTS

2008/0245948 A1* 10/2008 Tsai ..................... H10F 55/155
250/200

FOREIGN PATENT DOCUMENTS

CN 101191968 A 6/2008
CN 101212854 A 7/2008
(Continued)

OTHER PUBLICATIONS

PCT/CN2023/110385 international search report dated Apr. 12, 2024.
PCT/CN2023/110385 Written Opinion dated Apr. 12, 2024.

*Primary Examiner* — Mark R Gaworecki
(74) *Attorney, Agent, or Firm* — IPro, PLLC

(57) ABSTRACT

The application relates to a light detection structure, a display panel and a display device. The test circuit includes a photo transistor and an auxiliary transistor that are connected in series; the reference circuit includes a reference transistor; equivalent resistance values of the photo transistor, the auxiliary transistor and the reference transistor are same; a control end of the test circuit is connected with a control end of the reference circuit, and a signal input end of the test circuit is connected with a signal input end of the reference circuit; the signal processor includes a first input end and a second input end, and the first input end is electrically connected with the signal output end of the photo transistor; and the second input end is electrically connected with the signal output end of the reference transistor.

19 Claims, 7 Drawing Sheets

(56) References Cited

FOREIGN PATENT DOCUMENTS

| | | | |
|---|---|---|---|
| CN | 101281916 | A | 10/2008 |
| CN | 101458121 | A | 6/2009 |
| CN | 103033262 | B | 4/2015 |
| CN | 109491438 | A | 3/2019 |
| CN | 111412985 | A | 7/2020 |
| CN | 114038411 | A | 2/2022 |
| CN | 114323089 | A | 4/2022 |
| JP | 2006323260 | A | 11/2006 |

* cited by examiner

LIGHT DETECTION STRUCTURE, DISPLAY PANEL AND DISPLAY DEVICE

CROSS-REFERENCE TO RELATED APPLICATIONS

This patent application is a continuation application of International Application No. PCT/CN2023/110385, filed on Jul. 31, 2023, the contents of which are incorporated herein by reference in their entireties.

TECHNICAL FIELD

The present disclosure relates to a field of display technology, and particularly to a light detection structure, a display panel and a display device.

BACKGROUND

With a wide application of liquid crystal display (LCD) display panels, more and more electronic devices using LCD display panels are equipped with photo sensors (also referred to as light sensors or photosensitive sensors), so as to adjust the brightness of the LCD display panel according to the light brightness of the environment where the electronic device is located, thereby achieving better visual experience for users while saving power consumption.

SUMMARY

The purpose of the application is to provide a light detection structure, a display panel and a display device, which can improve the detection accuracy.

According to a first aspect of embodiments of the application, there is provided a light detection structure, including:

- a test circuit including a photo transistor and an auxiliary transistor connected in series, where the photo transistor is configured to receive an ambient light signal, and the auxiliary transistor is shielded from light; in response to that an illumination condition of the photo transistor is same as an illumination condition of the auxiliary transistor, an equivalent resistance value of the photo transistor is same as an equivalent resistance value of the auxiliary transistor; where a control end of the photo transistor is connected to a control end of the auxiliary transistor; a reference circuit, where a signal input end of the reference circuit is connected to a signal input end of the test circuit; and
- a signal processor including a first input end and a second input end, where the signal processor is configured to compare a signal of the first input end and a signal of the second input end; where the first input end is electrically connected to a signal output end of the photo transistor, and the second input end is electrically connected to the reference circuit.

Further, the test circuit and the reference circuit are jointly connected to a data end, and an electrical signal obtained at the second input end of the signal processor is an electrical signal output by the data end.

The reference circuit includes a reference transistor, and the reference transistor is shielded from light;

- in response to that illumination conditions of the photo transistor, the auxiliary transistor and the reference transistor are the same, an equivalent resistance value of the photo transistor, an equivalent resistance value of the auxiliary transistor and an equivalent resistance value of the reference transistor are the same; and a control end of the test circuit is connected with a control end of the reference circuit.

Further, there are multiple reference transistors, and the multiple reference transistors are connected in series; and a number of the reference transistors is the same as a sum of a number of the photo transistors and a number of the auxiliary transistors in the test circuit;

- a number of transistors between the first input end and the control end of the test circuit is the same as a number of transistors between the second input end and the control end of the reference circuit.

Further, the number of the reference transistors is different from the sum of the number of the photo transistors and the number of the auxiliary transistors in the test circuit;

- the number of transistors between the first input end and the control end of the test circuit is same as or different from the number of transistors between the second input end and the control end of the reference circuit.

Further, there are multiple auxiliary transistors, and the photo transistor and the auxiliary transistor are between the first input end and the control end of the test circuit, or only the photo transistor is between the first input end and the control end of the test circuit.

Further, the signal processor includes an operational amplifier.

Further, a minimum distance between the photo transistor and an auxiliary transistor adjacent to the photo transistor is less than or equal to 10 mm; and/or, a minimum distance between the test circuit and the reference circuit is less than or equal to 10 mm.

According to a second aspect of embodiments of the application, there is provided a display panel including the light detection structure.

Further, the display panel includes a display area and a non-display area, the display panel further includes a driving control layer, and the light detection structure is on the driving control layer and in the non-display area; and/or

- the display panel includes an outer light shielding layer, the outer light shielding layer is above the light detection structure, a through light-transmitting hole is formed in the outer light shielding layer, and an orthographic projection of the photo transistor onto the outer light shielding layer falls into the light-transmitting hole.

Further, the display panel further includes a backlight source assembly, and a color filter on a side of the photo transistor away from the backlight source assembly.

Further, there are multiple light detection structures, and the photo transistor in each of the light detection structures is provided with the color filter.

The color filters on at least two light detection structures have different colors.

According to a third aspect of the embodiments of disclosure, there is provided a display device including the display panel.

The technical solutions provided in the embodiments of the application have the following beneficial technical effects.

In the application, by providing auxiliary transistors and reference transistors with the same equivalent resistances as the photo transistor, the signal obtained at the signal processor is not affected by manufacturing process, thereby increasing the stability of the signal.

BRIEF DESCRIPTION OF DRAWINGS

In order to provide a clearer explanation of the technical solution in the embodiments of the application, the accompanying drawings required in the description of the embodiments will be briefly discussed below. It is obvious that the accompanying drawings in the following description are only some embodiments of the application. For those skilled in the art, other accompanying drawings can be obtained based on these drawings without creative effort.

DETAILED DESCRIPTION

Figure 1:
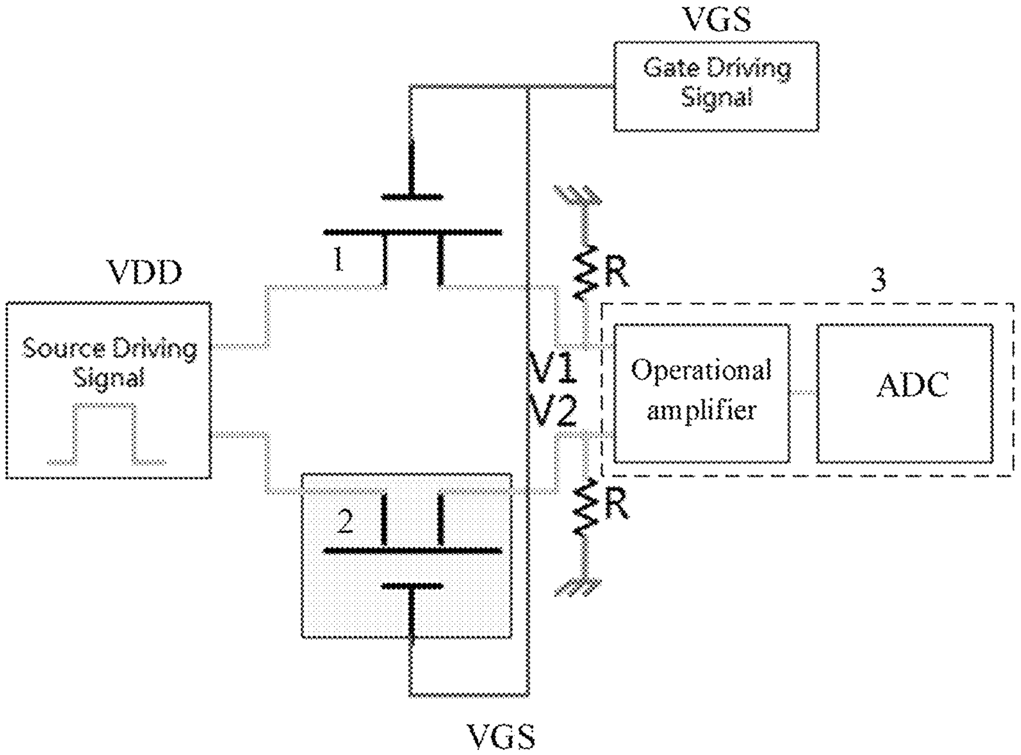
FIG. 1 is a schematic circuit diagram of a light detection structure.

Various embodiments will be described in detail herein, examples of which are illustrated in the accompanying drawings. When the following descriptions involve the drawings, like numerals in different drawings represent like or similar elements unless stated otherwise. The implementations described in the following example embodiments do not represent all implementations consistent with the application. Rather, they are merely examples of devices and methods consistent with some aspects of the application as detailed in the appended claims.

The words used in the present application are for the purpose of describing particular examples only, and are not intended to limit the present disclosure. Unless otherwise defined, the technical or scientific words used in this application shall have the usual meanings understood by those with ordinary skills in the field to which the application belongs. Similar words such as "a" or "an" used in the specification and claims of this application do not mean a quantity limit, but mean that there is at least one. "Multiple" means two or more. "Include" or "comprise" and other similar words mean that the elements or items before "include" or "comprise" cover the elements or items listed after "include" or "comprise" and their equivalents, and do not exclude other elements or objects. Similar words such as "connect" or "link" are not limited to physical or mechanical connections, and may include electrical connections, whether direct or indirect. "Lower," and/or "upper" are for convenience of description and are not limited to one location or one spatial orientation. Words like "a", "the" and "said" in their singular forms in the specification and the appended claims of the present application are also intended to include plurality, unless clearly indicated otherwise in the context. It is to be understood that the word "and/or" as used herein is and includes any and all possible combinations of one or more of associated listed items.

The present application discloses a display device including a display panel. The display panel includes a backlight source assembly, a driving control layer, a first electrode layer, a liquid crystal deflection module, a second electrode layer and a filter from bottom to top. The backlight source assembly emits light in a direction directed toward the filter. The driving control layer is electrically connected to the first electrode layer to control a potential difference between the first electrode layer and the second electrode layer, that is, to control the potential difference applied to the liquid crystal deflection module, so as to control the deflection direction of the liquid crystal in the liquid crystal deflection module, and then to control whether the light emitted by the backlight source assembly is able to pass through the liquid crystal deflection module to reach the filter and emit outward to be captured by the user.

The display panel can be applied to display devices such as mobile phones, computers, tablets and smart watches.

In order to reduce power consumption, increase standby time, and protect the eyes, related display devices have added a light detection structure for detecting ambient light. Through the light detection structure, the brightness or color temperature of the ambient light source is detected, and the detected brightness or color temperature is transmitted to the processor. After the processor determines the brightness and color temperature of the ambient light, the brightness and color temperature of the display device are re-adjusted and output, that is, the potential difference between the two sides of the liquid crystal deflection module is re-adjusted. For example, when the brightness of the ambient light is relatively bright, the pupil of the user's eye is relatively small, and there is less light entering the human eyes, at this time, the brightness of the display panel needs to be increased to allow users to see the content displayed on the display panel clearly. When the brightness of the ambient light is relatively dark, the pupil of the user's eye is relatively large, more light enters the human eyes, and at this time, the brightness of the display panel needs to be reduced, so as to avoid damaging the eyes due to the too strong light entering the eyes. In addition, due to the problem that the photoelectric curve characteristic of the photo sensor drifts, there is a large error in the detection accuracy of the light detection structure.

As shown in FIG. 1, in a design, the light detection structure includes a photo transistor 1, a reference transistor 2, and a signal processor 3.

A control end of the photo transistor 1 is connected with a control end of the reference transistor 2 to receive the same driving signal VGS. A signal input end of the photo transistor 1 is connected with a signal input end of the reference transistor 2 to receive the same data signal VDD. The signal processor 3 includes a first input end and a second input end, and the first input end and the second input end are respectively connected to signal output ends of the photo transistor 1 and the reference transistor 2. The voltage of the first input end is used as V1, and the voltage of the second input end is used as V2. The photo transistor 1 is configured to receive an ambient light signal, and the reference transistor 2 is shielded from light.

When the driving signal VGS and the data signal VDD are simultaneously applied to the photo transistor 1 and the reference transistor 2, the current (IDS) of the photo transistor 1 and the current (IDS) of the reference transistor 2 are calculated as follows:

$$IDS = \mu FE \times Cox \times \frac{W}{L}\left[(VGS - VTH) \times VDD - \frac{1}{2}VDD^2\right],$$

where μFE represents a charge carrier mobility determined by the electric field effect, and a value of the charge carrier mobility is affected by temperature and illumination. Cox represents a capacitance per unit area of a gate oxide film, and a value of the capacitance is relatively fixed for the same transistor. W/L represents channel width/channel length, a value of channel width/channel length is relatively fixed for the same transistor. VTH represents a threshold voltage, which is the minimum gate voltage required for the transistor to transition from an off state to an on state.

Since the equivalent resistance values R of the photo transistor 1 and the reference transistor 2 are the same, it means that Cox and W/L of the photo transistor 1 and Cox and W/L of the reference transistor 2 are the same. And the photo transistor 1 and the reference transistor 2 are close to each other, and the temperature of the environment where the two are located may be considered the same. At this time, the IDS difference between the photo transistor 1 and the reference transistor 2 is affected by the lighting condition. Correspondingly, V1=IDS1×R, and V1=IDS2×R.

When the photo transistor 1 is not illuminated, the IDS corresponding to the photo transistor 1 and the IDS corresponding to the reference transistor 2 are the same, that is, IDS1=IDS2, and V1=V2.

When the photo transistor 1 is illuminated, IDS1 corresponding to the photo transistor 1 is greater than IDS2 corresponding to the reference transistor 2, that is, IDS1 is greater than IDS2, then V1=IDS1×R>V2=IDS2×R.

The signal processor 3 includes an operational amplifier and an analog-to-digital converter, a signal output end of the operational amplifier is electrically connected to a signal input end of the analog-to-digital converter (ADC). The electrical signal output by the operational amplifier is A×(V1−V2)=A×R×(IDS1−IDS2). Where A is a gain of the operational amplifier 410.

Figure 2:
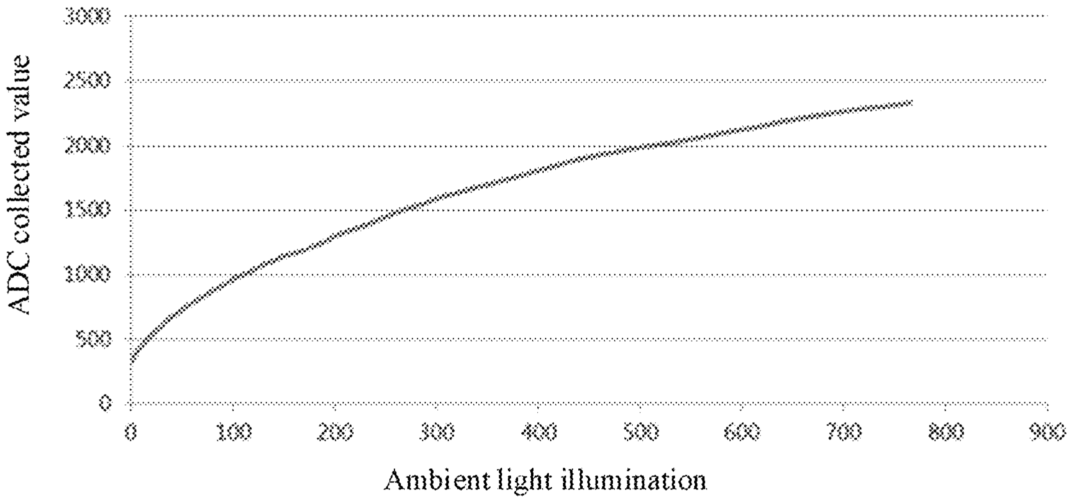
FIG. 2 is a photoelectric curve diagram of a display panel.

A curve of the ambient illuminance and the ADC collected value obtained through the above manner is shown in FIG. 2. The controller is electrically connected to the signal processor to receive a sampling value sent by the analog-to-digital converter, and controls the driving control layer to apply different voltages to the liquid crystal deflection layer according to the sampling value, so as to adjust the display panel to display at different brightness.

Figure 3:
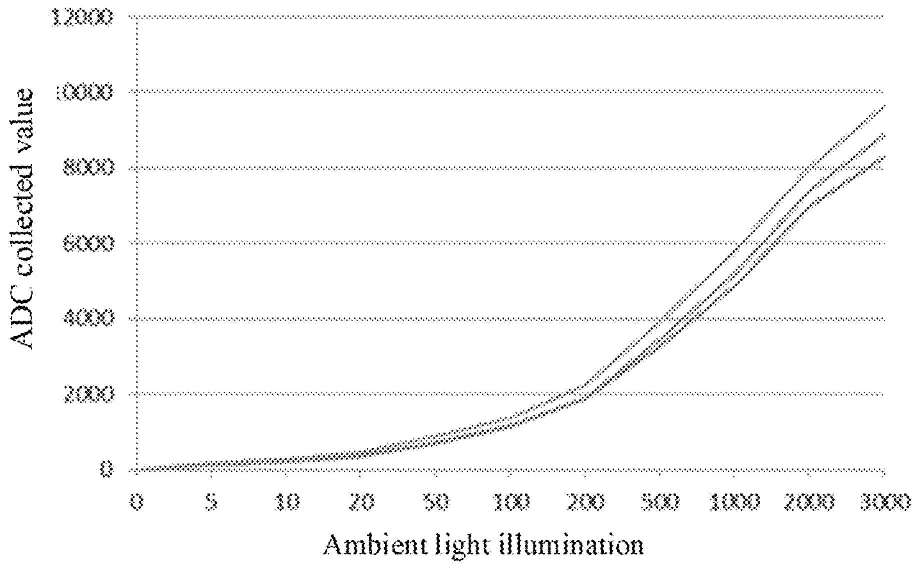
FIG. 3 is a photoelectric curve diagram of a plurality of display panels.

However, the inventors have found through experiments that the three factors μFE, Cox and W/L are affected by manufacturing process drift, resulting in a large difference in IDS values of the same transistors in different display panels 10. The inventor tests three different display panels 10, and curves of the collected ambient illuminance and ADC collected values are shown in FIG. 3. Therefore, before shipment, the photoelectric curve of each display panel 10 needs to be adjusted, and after shipment, the photoelectric curve change drift may be caused by the environment temperature change.

Figure 4:
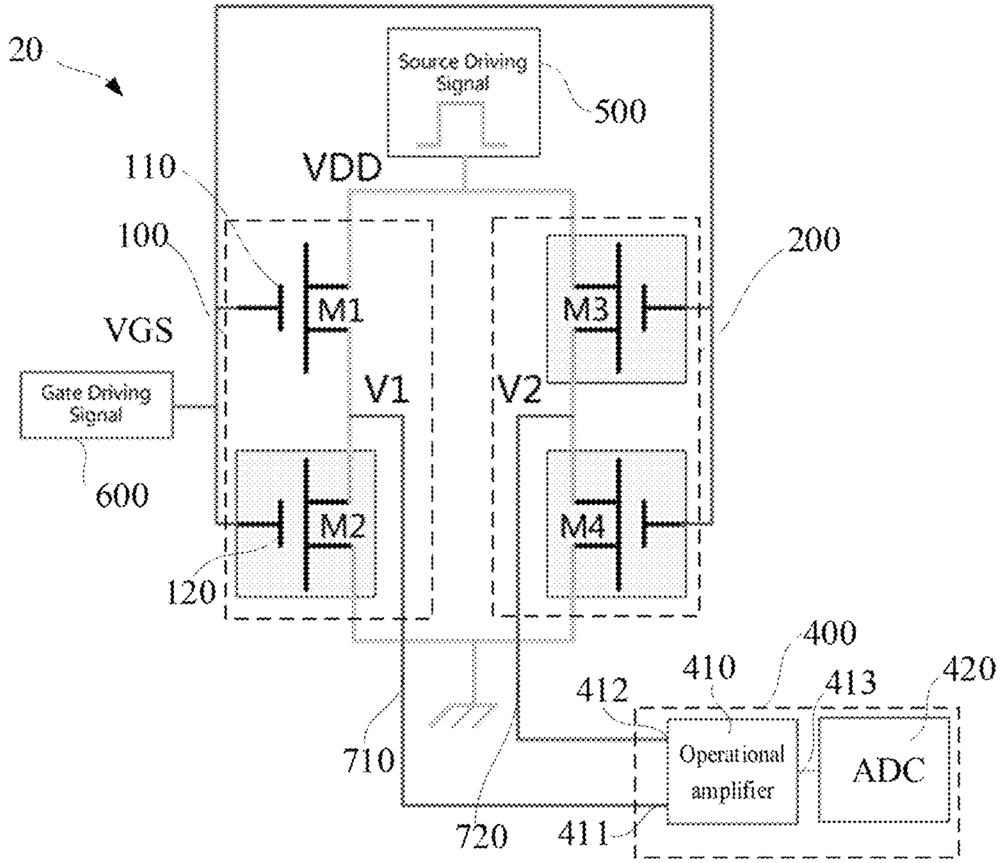
FIG. 4 is a schematic circuit diagram of a light detection structure according to an embodiment of the application.
Figure 5:
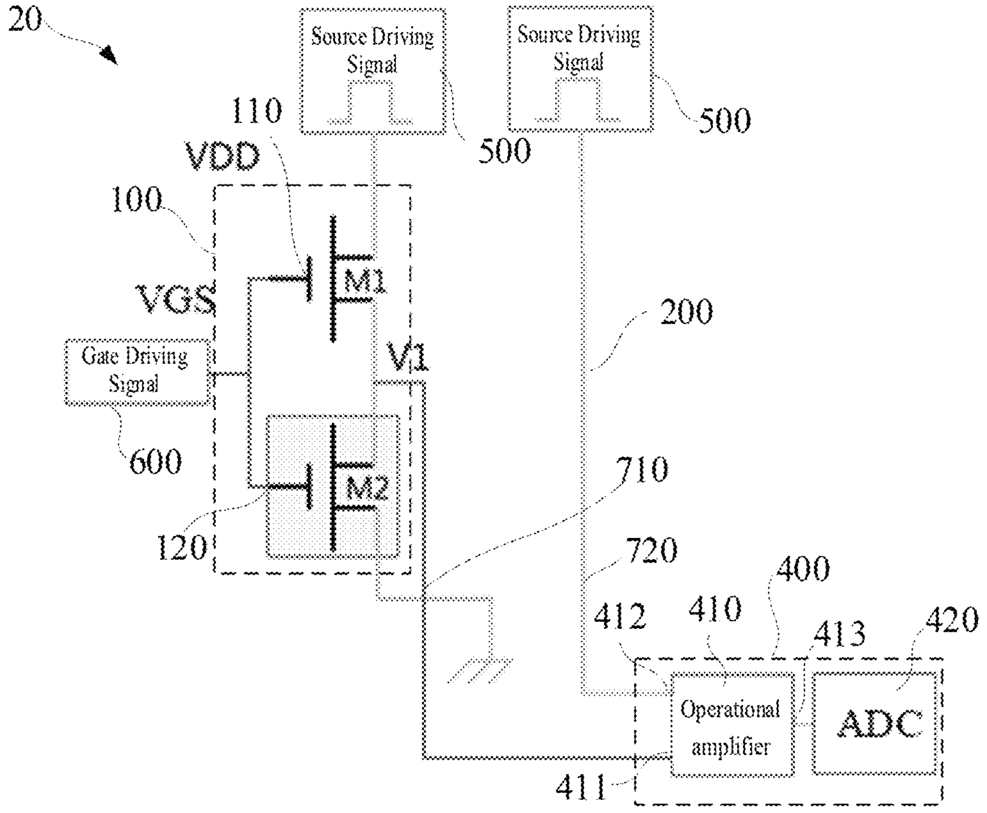
FIG. 5 is a schematic circuit diagram of a light detection structure according to another embodiment of the application.

In order to solve the above problems, the inventors have made the following improvements:

In some embodiments, as shown in FIG. 4 and FIG. 5, the light detection structure 20 includes a test circuit 100, a reference circuit 200, and a signal processor 400.

The test circuit 100 includes a photo transistor 110 and an auxiliary transistor 120 connected in series. The photo transistor 110 is configured to receive an ambient light signal, and the auxiliary transistor 120 is shielded from light. When the light conditions of the photo transistor 110 and the auxiliary transistor 120 are the same, the equivalent resistances thereof are the same. The control end of the photo transistor 110 is connected to the control end of the auxiliary transistor 120, that is, the control end (gate electrode) of the photo transistor 110 and the control end (gate electrode) of the auxiliary transistor 120 are jointly connected to the same driving control end 600, so as to synchronously obtain the driving signal VGS to implement synchronous turn-on or turn-off. The photo transistor 110 and the auxiliary transistor 120 are connected in series and connected to the data end 500 to obtain the data signal VDD.

The signal processor 400 includes a first input end 411 and a second input end 412, and the signal processor 400 is configured to compare signals of the first input end 411 and the second input end 412. The first input end 411 is electrically connected to the signal output end of the photo transistor 110. The second input end 412 is electrically connected to the reference circuit 200.

As illustrated in the embodiment shown in FIG. 4, the photo transistor 110 includes one photo transistor 110 (denoted by M1 below) and one auxiliary transistor 120 (denoted by M2 below) connected in series.

It is assumed that the equivalent resistance of M1 is Roff1, the equivalent resistance of M2 is Roff2, and the equivalent resistance of M3 is Roff3. The voltage at the end of the first signal line 710 in contact with the test circuit 100 (i.e., the position between M1 and M2) is taken as V1, that is, the voltage received at the first input end 411 of the signal processor 400 is V1.

When M1 is not illuminated, the IDS corresponding to M1 is same as the IDS corresponding to M2. Since IDS is proportional to 1/Roff (Roff is the equivalent resistance of the transistor), Roff1=Roff2, in other words, when the data end 500 outputs the voltage VDD, the relationship between V1 and V2 is as follows:

$$V1 = VDD \times Roff2/(Roff1 + Roff2) = \frac{1}{2}VDD;$$

V2=mVDD (the data of m depends on the specific structure of the reference circuit 200, which will be explained below).

When M1 is illuminated, the leakage current of IDS1 corresponding to M1 will increase, and the mobility of μFE charge carriers will increase. When the data end 500 outputs the voltage VDD, due to the IDS is proportional to 1/Roff (Roff is the equivalent resistance of the transistor), the relationship between the equivalent resistor Roff1 of M1 and the equivalent resistor Roff2 of M2 is as follows:

$$\frac{Roff1}{Roff2} = \frac{IDS2}{IDS1} = \frac{\mu FE2 \times Cox \times \frac{W}{L}\left[(VGS - VTH) \times VDD - \frac{1}{2}VDD^2\right]}{\mu FE1 \times Cox \times \frac{W}{L}\left[(VGS - VTH) \times VDD - \frac{1}{2}VDD^2\right]} = \frac{\mu FE2}{\mu FE1},$$

$$V1 = VDD \times Roff2/(Roff1 + Roff2) = VDD \times \mu FE1/(\mu FE1 + \mu FE2);$$

according to the above derivation formula, it can be seen that by adding the auxiliary transistor 120 having the same equivalent resistance as the photo transistor 110 under the same illumination condition on the light detection structure 20, the parameters affecting the value of V1 will be simplified, such that the value of V1 is only affected by the mobility of the μFE charge carriers, and the manufacturing process factors on the same display panels 10 are eliminated, such that the input voltage and the output voltage obtained at the signal processor 400 are only related to the mobility of the μFE charge carriers after illumination and the controllable VDD, thereby avoiding the problems of unexpected drift in the photoelectric curves of different display panels 10 and unexpected drift in the photoelectric curves caused by environmental temperature changes when using the display panel 10.

Specifically, as shown in FIG. 5, the reference circuit 200 may not include any component, in this case, the test circuit 100 and the reference circuit 200 are jointly connected to the data end 500, and the electrical signal obtained at the second input end 412 of the signal processor 400 is an electrical signal output by the data end 500, in other words, the voltage of V2 is always VDD. When M1 is not illuminated:

$$V1=\frac{1}{2}VDD;\ V2=VDD\left(\text{in this case, the above-mentioned } m \text{ is } 1\right);\ \frac{V1}{V2}=\frac{1}{2}.$$

When M1 is illuminated;

$$V1=VDD\times Roff2/(Roff1+Roff2)=VDD\times\mu FE1/(\mu FE1+\mu FE2),\ V2=VDD;\ \frac{V1}{V2}=\mu FE1/(\mu FE1+\mu FE2).$$

Figure 6:
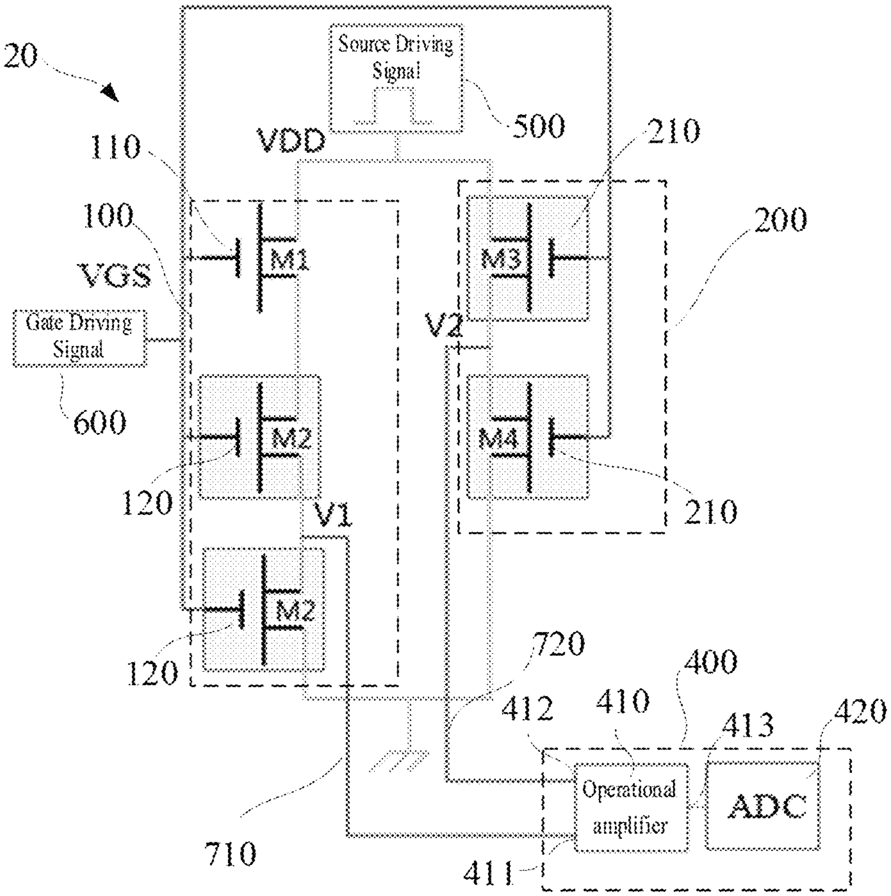
FIG. 6 is a schematic circuit diagram of a light detection structure according to yet another embodiment of the application.

As shown in FIG. 4 and FIG. 6, the reference circuit 200 includes a reference transistor 210. Equivalent resistances of the photo transistor 110, the auxiliary transistor 120 and the reference transistor 210 are the same. It should be noted that, the resistances being same means that when the illumination conditions of the photo transistor 110, the auxiliary transistor 120 and the reference transistor 210 are consistent, the equivalent resistance values of the photo transistor 110, the auxiliary transistor 120 and the reference transistor 210 are the same. In other words, when the illumination conditions of the three transistors are consistent, corresponding values of the three factors μFE, Cox and W/L are the same. Meanwhile, the control end of the test circuit 100 is connected to the control end of the reference circuit 200, that is, the control ends of the photo transistor 110, the auxiliary transistor 120 in the test circuit 100, and the reference transistor 210 in the reference circuit 200 are jointly connected to the same data end 500 to synchronously obtain the data signal VDD. The signal input end of the test circuit 100 is connected to the signal input end of the reference circuit 200, and are jointly connected to the driving control end 600, so as to synchronously obtain the same driving signal VGS, thereby realizing synchronous turn-on and turn-off.

The first input end 411 of the signal processor 400 is electrically connected to the signal output end of the photo transistor 110 through the first signal line 710, that is, directly connection (referring to FIG. 4), or indirectly connection (referring to FIG. 6) that the first signal line 710 connects a point between the photo transistor 110 and the auxiliary transistor 120. In other words, one end of the first signal line 710 is directly or indirectly electrically connected between the signal output end of the photo transistor 110 and the auxiliary transistor 120, and the other end of the first signal line 710 is connected to the first input end 411 of the signal processor 400. The second input end 412 of the signal processor 400 is electrically connected to the signal output end of the reference transistor 210 through the second signal line 720. In other words, one end of the second signal line 720 is electrically connected to the signal output end of the reference transistor 210, and the other end of the second signal line 720 is connected to the second input end 412 of the signal processor 400.

By providing the auxiliary transistor 120 and the reference transistor 210 with the same equivalent resistances as the photo transistor 110, the signal obtained at the signal processor 400 can be not affected by the manufacturing process, thereby increasing the stability of the signal.

As illustrated in the embodiment corresponding to FIG. 4, the photo transistor 110 includes one photo transistor 110 (denoted by M1 below) and one auxiliary transistor 120 (denoted by M2 below) connected in series. The reference transistor 210 includes two reference transistors 210 (denoted as M3 and M4 below, respectively) connected in series.

It is assumed that the equivalent resistance of M1 is Roff1, the equivalent resistance of M2 is Roff2, the equivalent resistance of M3 is Roff3, and the equivalent resistance of M4 is Roff4. The voltage at the end of the first signal line 710 in contact with the test circuit 100 (i.e., the position between M1 and M2) is taken as V1, that is, the voltage received at the first input end 411 of the signal processor 400 is V1. The voltage at the end of the second signal line 720 in contact with the reference circuit 200 (i.e., the position between M3 and M4) is taken as V2, that is, the voltage received at the second input end 412 of the signal processor 400 is V2.

As described above, when M1 is not illuminated, the relationship between V1 and V2 is as follows:

$$V1=VDD\times Roff2/(Roff1+Roff2)=\frac{1}{2}VDD;$$

$$V2=VDD\times Roff3/(Roff3+Roff4)=\frac{1}{2}VDD\left(\text{in this case, the above-mentioned } m \text{ is } \frac{1}{2}\right).$$

In this embodiment, the signal processor 400 includes an operational amplifier 410, and the operational amplifier 410 further includes a signal output end 413, at this time, the voltage output by the signal output end 413 is $U_0=0$.

As described above, when M1 is illuminated, $$V1=VDD\times Roff2/(Roff1+Roff2)=VDD\times\mu FE1/(\mu FE1+\mu FE2)$$

$$V2=VDD\times Roff3/(Roff3+Roff4)=\frac{1}{2}VDD.$$

After being processed by the operational amplifier 410, the voltage output by the signal output end 413 is:

$$Uo=\frac{1}{2}\times\frac{\mu FE1-\mu FE2}{\mu FE1+\mu FE2}.$$

According to the above derivation formula, it can be seen that the auxiliary transistor 120 having the same equivalent resistance as the photo transistor 110 under the same illumination condition is added on the light detection structure 20 to eliminate the manufacturing process factor on the same display panels 10, such that the input voltage and the output voltage obtained at the signal processor 400 are only related to the mobility of the μFE charge carrier after illumination and the controllable VDD, thereby avoiding the problems of the unexpected drift of the photoelectric curve of different display panels 10 and the unexpected drift in the photoelectric curves caused by environmental temperature changes when using the display panel 10.

It should be noted that "when M1 is not illuminated" mentioned above should be understood as "when an intensity of the optical signal received at the photo transistor 110 is less than or equal to a threshold", the voltage of the first input end 411 is equal to the voltage of the second input end 412. "When M1 is illuminated" should be understood as "when the intensity of the optical signal received at the photo transistor 110 is greater than the threshold", the voltage of the first input end 411 is greater than the voltage of the second input end 412. The threshold may be determined according to an actual situation, and a corresponding transistor is selected or debugged according to the determined value.

In the above arrangement, there are a plurality of reference transistors 210, and the plurality of reference transistors 210 are connected in series. Moreover, the number of the reference transistors is the same as the sum of the number of the photo transistors 110 and the number of the auxiliary transistors 120 in the test circuit. The number of transistors between the first input end 411 and the control end of the test circuit 100 is the same as the number of transistors between the second input end 412 and the control end of the reference circuit 200. In this embodiment, by limiting the number of transistors and limiting the connection positions of the first signal line 710 and the second signal line 720, when M1 is not illuminated, V1=V2, and the voltage output by the operational amplifier 410 is $U_0=0$. It is convenient for drawing and comparing photoelectric curve graphs.

In the embodiment corresponding to FIG. 4, the number of transistors between the first input end 411 and the control end of the test circuit 100 is the same as the number of transistors between the second input end 412 and the control end of the reference circuit 200.

In other embodiments, the number of transistors between the first input end 411 and the control end of the test circuit 100 may be different from the number of transistors between the second input end 412 and the control end of the reference circuit 200.

Figure 7:
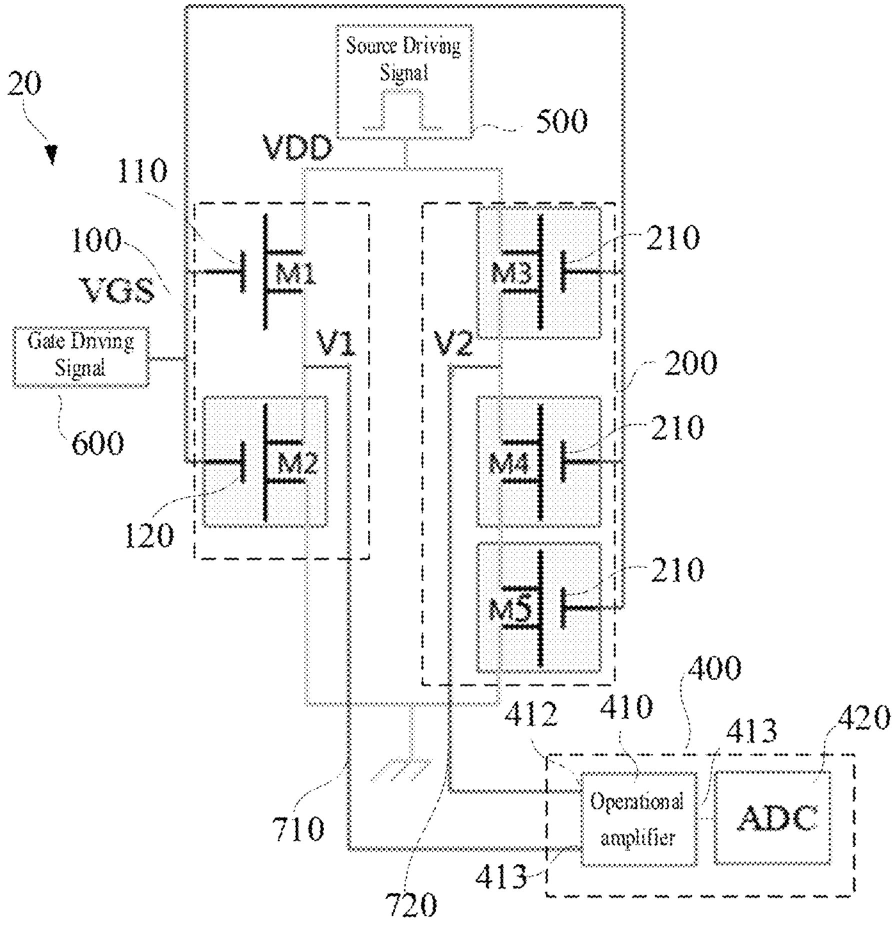
FIG. 7 is a schematic circuit diagram of a light detection structure according to another embodiment of the application.
Figure 8:
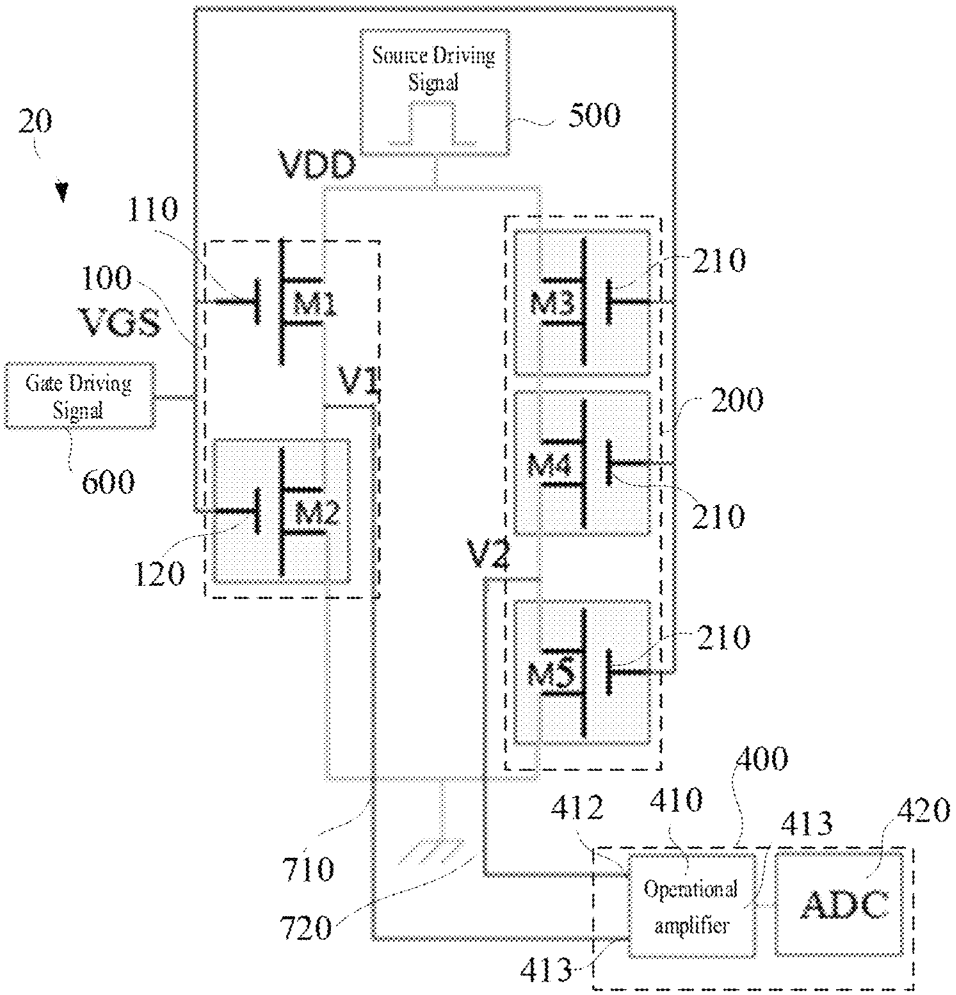
FIG. 8 is a schematic circuit diagram of a light detection structure according to another embodiment of the application.

As shown in FIG. 7 and FIG. 8, the number of the transistors in the test circuit 100 is 2, that is, one photo transistor 110 and one auxiliary transistor 120. The number of reference transistors 210 in the reference circuit 200 is 3.

In an embodiment, a connection relationship between the first signal line 710 and the second signal line 720 is shown in FIG. 7. When M1 is not illuminated, $$V1=\frac{1}{2}VDD,\ V2=\frac{2}{3}VDD\left(\text{in this case, the above-mentioned } m \text{ is } \frac{2}{3}\right),\ \frac{V1}{V2}=\frac{3}{4}.$$

When M1 is illuminated, $$V1=VDD\times\mu FE1/(\mu FE1+\mu FE2),\ V2=\frac{2}{3}VDD,\ \frac{V1}{V2}=\frac{3}{4}\times\frac{\mu FE1}{\mu FE1+\mu FE2}.$$

In another embodiment, a connection relationship between the first signal line 710 and the second signal line 720 is shown in FIG. 8. When M1 is not illuminated, $$V1=\frac{1}{2}VDD,\ V2=\frac{1}{3}VDD\left(\text{in this case, the above-mentioned } m \text{ is } \frac{1}{3}\right),\ \frac{V1}{V2}=\frac{3}{2}.$$

When M1 is illuminated, $$V1=VDD\times\mu FE1/(\mu FE1+\mu FE2),\ V2=\frac{1}{3}VDD,\ \frac{V1}{V2}=\frac{3}{2}\times\frac{\mu FE1}{\mu FE1+\mu FE2}.$$

By analogy, the number of the reference transistors 210 in the reference circuit 200 is 4, 5, 6 or more.

Similarly, in the embodiment corresponding to FIG. 4, only the auxiliary transistor 120 is between the first input end 411 and the control end of the test circuit 100.

In other embodiments, there may be a plurality of auxiliary transistors 120, and there is not only a photo transistor 110 but also one or more auxiliary transistors 120 between the first input end 411 and the control end of the test circuit 100. As shown in FIG. 6, when M1 is not illuminated, $$V1=\frac{1}{3}VDD.$$

When M1 is illuminated, V1=VDD×μFE1/(μFE1+μFE2+μFE2).

The inventor finds through a large number of experiments that μFE is not only affected by an illumination condition, but also affected by temperature. In order to reduce the influence of the temperature on the μFE of different transistors, and to improve the accuracy of detecting the illumination condition, the inventor has also conducted the following research, and the inventor finds that when the minimum distance between the photo transistor 110 and an auxiliary transistor 120 adjacent to the photo transistor 110 is less than or equal to 10 mm, which can greatly ensure that the temperature of the environment in which the photo transistor 110 and the adjacent auxiliary transistor 120 are located is the same, such that even if the temperature may affect μFE, the ratio value of V1 will not be greatly affected, thus ensuring the accuracy of detection. If the reference circuit 200 is provided with the reference transistor 210, it needs to be ensured that the minimum distance between the test circuit 100 and the reference circuit 200 is less than or equal to 10 mm. That is, the minimum distance between the reference transistor 210 and the photo transistor 110 or auxiliary transistor 120 that are adjacent to the reference transistor 210 is less than or equal to 10 mm.

Further, the inventors have found that the conventional display device adopts a discrete ambient light sensor scheme, that is, components such as a light detection structure and a camera module are integrated, holes are formed in the display area of the display panel, and the integrated components are in the holes in the display area of the display panel. The structure has poor aesthetics.

Figure 9:
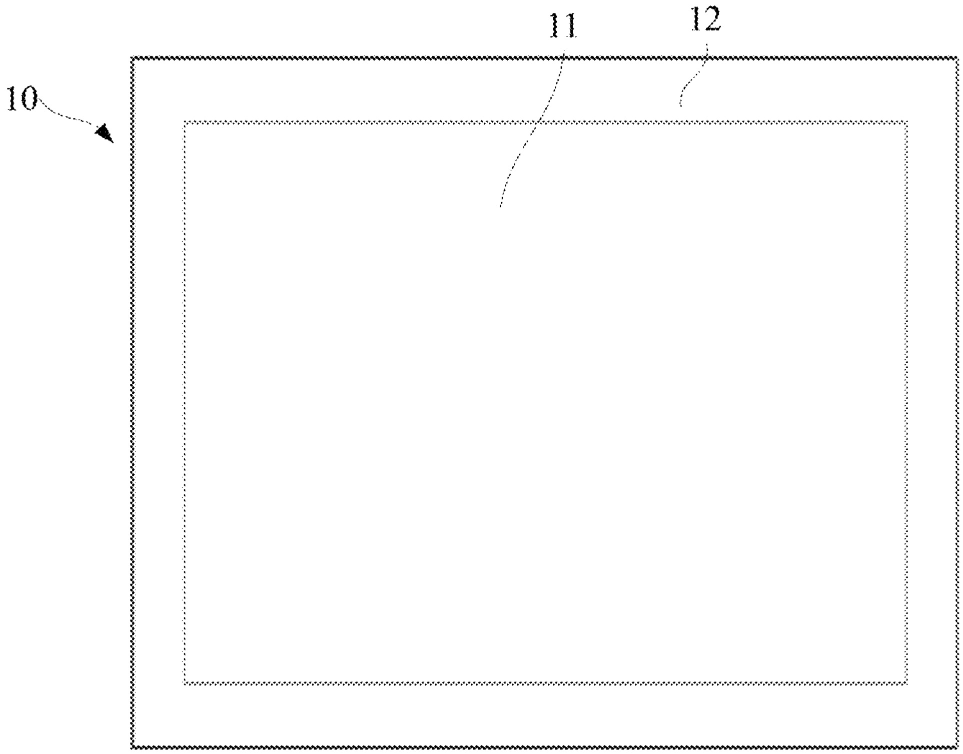
FIG. 9 is a schematic diagram of a display panel according to an embodiment of the application.

In view of this problem, the inventors have made the following improvements:

As shown in FIG. 9, the display panel 10 includes: a display area 11 and a non-display area 12. The light detection structure 20 is on the driving control layer and in the non-display area 12. Through the above arrangement, the light detection structure 20 is integrated into the non-display area 12, so as to avoid excessive exposure of light detection structure, thereby improving the overall aesthetics.

In addition, the display panel 10 includes an inner light-shielding layer and an outer light-shielding layer, and the inner light-shielding layer is on a side of the test circuit 100 and the reference circuit 200 close to the backlight source assembly, so as to avoid an influence of light emitted by the backlight source assembly on the transistor. The outer light-shielding layer is above the light detection structure 20, that is, on a side of the test circuit 100 and the reference circuit 200 away from the backlight source assembly. Meanwhile, the outer light-shielding layer is provided with a through light-transmitting hole, and an orthographic projection of the photo transistor 110 onto the outer light-shielding layer falls into the light-transmitting hole, so as to prevent external ambient light from irradiating the auxiliary transistor 120 and the reference transistor 210, that is, the above-mentioned light shielding processing. Meanwhile, it is ensured that the photo crystal can receive an external ambient light signal through the light-transmitting hole.

Further, the light detection structure 20 can not only detect the brightness of the external light, and adjust the brightness of the display panel 10 according to the detection result, but also detect the color temperature. In some embodiments, a color filter may be additionally arranged on a side of the photo transistor 110 away from the backlight source assembly, and the color filter is in the light-transmitting hole, or an orthographic projection of the light-transmitting hole along a thickness direction is in the color filter, and it can be that the external ambient light is first filtered by a color filter and then enters the photo transistor 110 to achieve color temperature detection.

Meanwhile, there are a plurality of light detection structures 20, and the photo transistor 110 in each light detection structure 20 is provided with a color filter. The color filters on at least two light detecting structures 20 have different colors. For example, the number of the light detection structures 20 may be 4, one of the light detection structures 20 is not provided with a color filter, and the other three light detection structures 20 are provided with a red filter, a blue filter and a green filter respectively, and the plurality of photo transistors 110 are used to perform color temperature detection and brightness detection for different colors, thereby achieving color temperature compensation, and improving the display effect.

Figure 10:
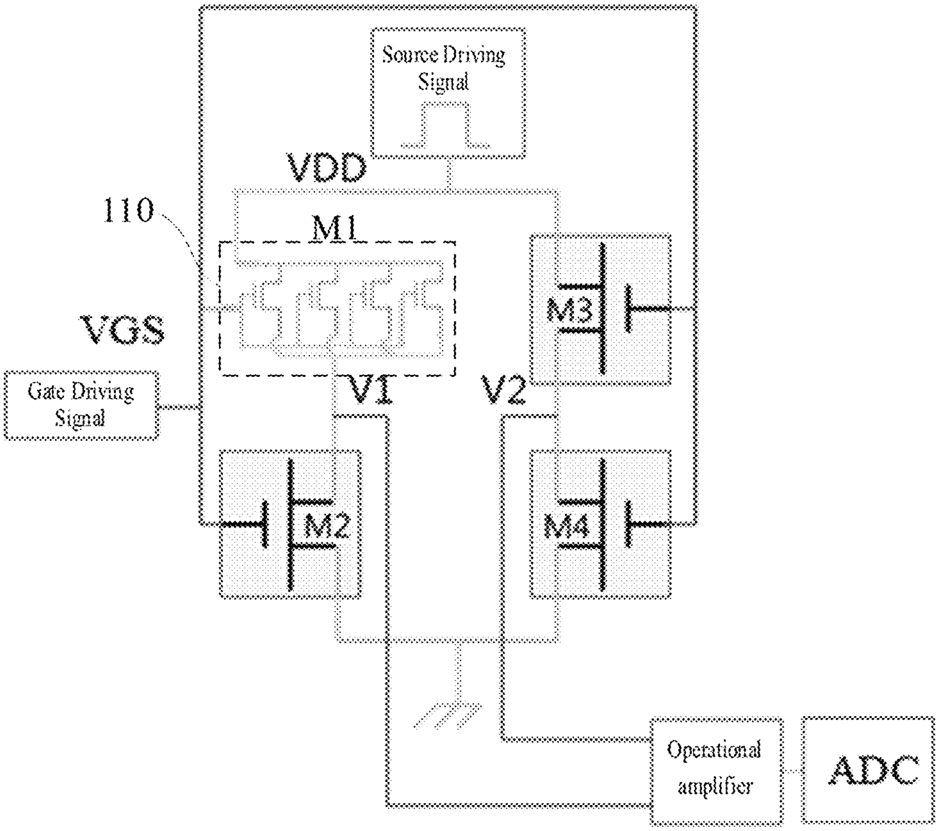
FIG. 10 is a schematic circuit diagram of a light detection structure according to another embodiment of the application.

It should be noted that the above-mentioned transistor is not composed of a single transistor TFT (Thin Film Transistor), but is formed by connecting a plurality of TFTs in parallel (referring to FIG. 10, FIG. 10 only briefly illustrates the TFTs in the photo transistor). In this way, the area of the transistor is increased, and the sensitivity of receiving the optical signal is improved.

In the application, the structural embodiment and the method embodiment may be complementary to each other if they are not in conflict.

In the present disclosure, terms "first" and "second" are used for descriptive purposes only and are not to be construed as indicating or implying a relative importance. The terms "a plurality" and "several" indicate two or more, unless specifically defined otherwise.

Those skilled in the art will readily conceive other embodiments of the present disclosure upon consideration of the specification and practice of the various embodiments disclosed herein. The description is intended to cover any variations, invention or adaptations of the present disclosure, which are in accordance with the general far of the disclosure and include common general knowledge or common technical means in the art that are not disclosed in this disclosure. The specification and embodiments are considered as examples only, true scope and spirit of the application is indicated by the following claims.

It is to be understood that the present disclosure is not limited to the precise structures described above and shown in the drawings, and various changes and modifications may be made without departing from the scope thereof. The scope of the present disclosure is limited only by the appended claims.

The invention claimed is:

1. A light detection structure, comprising:

a test circuit comprising a photo transistor and an auxiliary transistor connected in series, wherein the photo transistor is configured to receive an ambient light signal, and the auxiliary transistor is shielded from light; in response to that an illumination condition of the photo transistor is same as an illumination condition of the auxiliary transistor, an equivalent resistance value of the photo transistor is same as an equivalent resistance value of the auxiliary transistor; and a control end of the photo transistor is connected to a control end of the auxiliary transistor;

a reference circuit, wherein a signal input end of the reference circuit is connected to a signal input end of the test circuit; and a signal processor comprising a first input end and a second input end, wherein the signal processor is configured to compare a signal of the first input end and a signal of the second input end; wherein the first input end is electrically connected to a signal output end of the photo transistor, and the second input end is electrically connected to the reference circuit.

2. The light detection structure according to claim 1, wherein the test circuit and the reference circuit are jointly connected to a data end, and an electrical signal obtained at the second input end of the signal processor is an electrical signal output by the data end.

3. The light detection structure according to claim 1, wherein the reference circuit comprises a reference transistor, and the reference transistor is shielded from light;

in response to that illumination conditions of the photo transistor, the auxiliary transistor and the reference transistor are same, an equivalent resistance value of the photo transistor, an equivalent resistance value of the auxiliary transistor and an equivalent resistance value of the reference transistor are same; and a control end of the test circuit is connected with a control end of the reference circuit.

4. The light detection structure according to claim 3, wherein there are multiple reference transistors, and the multiple reference transistors are connected in series; and a number of the multiple reference transistors is same as a sum of a number of photo transistors and a number of auxiliary transistors in the test circuit;

a number of transistors between the first input end and the control end of the test circuit is same as a number of transistors between the second input end and the control end of the reference circuit.

5. The light detection structure according to claim 4, wherein in response to that an intensity of an optical signal received by the photo transistor is less than or equal to a threshold, a voltage of the first input end is equal to a voltage of the second input end;

in response to that the intensity of the optical signal received by the photo transistor is greater than the threshold, the voltage of the first input end is greater than the voltage of the second input end.

6. The light detection structure according to claim 3, wherein a number of the reference transistors is different from a sum of a number of photo transistors and a number of auxiliary transistors in the test transistor;

a number of transistors between the first input end and the control end of the test circuit is same as a number of transistors between the second input end and the control end of the reference circuit.

7. The light detection structure according to claim 3, wherein a number of the reference transistors is different from a sum of a number of photo transistors and a number of auxiliary transistors in the test transistor; and a number of transistors between the first input end and the control end of the test circuit is different from a number of transistors between the second input end and the control end of the reference circuit.

8. The light detection structure according to claim 1, wherein there are multiple auxiliary transistors, and a photo transistor and the multiple auxiliary transistors are between the first input end and the control end of the test circuit.

9. The light detection structure according to claim 1, wherein only a photo transistor is between the first input end and the control end of the test circuit.

10. The light detection structure according to claim 1, wherein the signal processor comprises an operational amplifier.

11. The light detection structure according to claim 1, wherein a minimum distance between the photo transistor and an auxiliary transistor adjacent to the photo transistor is less than or equal to 10 mm.

12. The light detection structure according to claim 1, wherein a minimum distance between the test circuit and the reference circuit is less than or equal to 10 mm.

13. A display panel comprising the light detection structure according to claim 1.

14. The display panel according to claim 13, wherein the display panel comprises a display area and a non-display area, and the display panel further comprises a driving control layer, and the light detection structure is on the driving control layer and in the non-display area.

15. The display panel according to claim 13, wherein the display panel comprises an outer light shielding layer, the outer light shielding layer is above the light detection structure, a through light-transmitting hole is formed in the outer light shielding layer, and an orthographic projection of the photo transistor onto the outer light shielding layer falls into the light-transmitting hole.

16. The display panel according to claim 13, further comprising a backlight source assembly and a color filter, wherein the color filter is on a side of the photo transistor away from the backlight source assembly.

17. The display panel according to claim 16, wherein there are a plurality of light detection structures, and the photo transistor in each of the plurality of light detection structures is provided with the color filter.

18. The display panel according to claim 16, wherein color filters on at least two light detection structures have different colors.

19. A display device comprising the display panel according to claim 13.

* * * * *